(12) United States Patent
Jen

(10) Patent No.: US 6,392,005 B1
(45) Date of Patent: May 21, 2002

(54) MANUFACTURING METHOD FOR DECREASING THE CYCLIC OLIGOMER CONTENT IN POLYESTER

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/853,595

(22) Filed: May 14, 2001

(30) Foreign Application Priority Data

Mar. 19, 2001 (TW) .......................................... 90106311

(51) Int. Cl.$^7$ .............................................. C08G 63/68
(52) U.S. Cl. ...................... 528/287; 528/180; 528/212; 528/275; 528/279; 528/283; 528/285; 528/302; 528/308.6; 528/481; 528/503; 524/711; 524/783
(58) Field of Search ................................ 528/275, 279, 528/283, 285, 287, 302, 308.6, 180, 212, 481, 503; 524/711, 783

(56) References Cited

U.S. PATENT DOCUMENTS 6,156,441 A    12/2000    Hamada et al. ............. 428/480

FOREIGN PATENT DOCUMENTS

| JP | 53101092   | 9/1978  |
|----|------------|---------|
| JP | 55089830   | 7/1980  |
| JP | 55089831   | 7/1980  |
| JP | 59025815   | 2/1984  |
| JP | 03174441   | 7/1991  |
| JP | 06234834   | 8/1994  |
| JP | 09151308   | 6/1997  |
| JP | 09221540   | 8/1997  |
| JP | 09296029   | 11/1997 |
| JP | 10168168   | 6/1998  |
| JP | 10259245   | 9/1998  |
| JP | 11080520   | 3/1999  |
| JP | 11181257   | 7/1999  |
| JP | 2000007767 | 1/2000  |
| JP | 2000080284 | 3/2000  |
| JP | 00204229   | 7/2000  |
| JP | 2000198937 | 7/2000  |
| JP | 2000219729 | 8/2000  |
| JP | 2000219731 | 8/2000  |

*Primary Examiner*—Samuel A. Acquah
(74) *Attorney, Agent, or Firm*—Stevens, Davis, Miller & Mosher, LLP

(57) ABSTRACT

The present invention relates to a manufacturing method for decreasing the cyclic oligomer content in polyester which effectively restrains the production of the cyclic oligomer in ester chips and further decreases the amount of regenerated cyclic oligomer at the melting process stage by adding the additive, during the process of manufacturing polyethylene terephthalate, with the following structure:

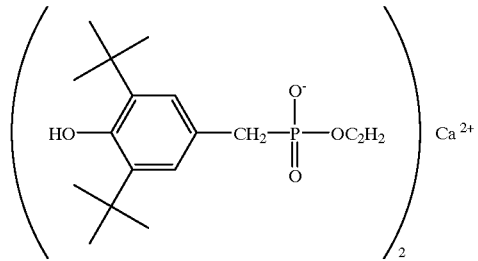

5 Claims, No Drawings

MANUFACTURING METHOD FOR DECREASING THE CYCLIC OLIGOMER CONTENT IN POLYESTER

BACKGROUND OF THE INVENTION

1. Field of the Invention

The present invention relates to a manufacturing method which effectively restrains the production of the cyclic oligomer in ester chips and further decreases the amount of regenerated cyclic oligomer at the melt processing stage by adding the additive, during the process of manufacturing polyethylene terephthalate, with the following structure:

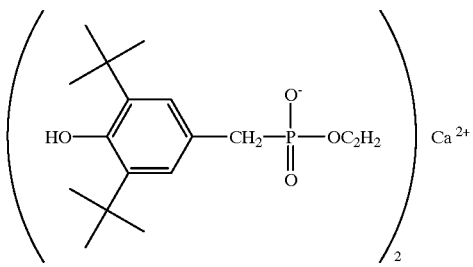

the polymer of the present invention can be further processed to manufacture polyester products such as bottles, fibers, film, and laminates. The examples of polyester bottles mentioned in the present invention are given to illustrate but not to limit the invention.

2. Problems to be Solved by the Present Invention

Polyethylene terephthalate (PET) is widely used in manufacturing products such as polyester bottles, polyester fiber, polyester laminates, and polyester films owing to its good physical characters and capability of being recycled. Particularly, polyester bottles are massively used in packaging various kinds of food, beverage, and detergent, which contributes to the sky-rocket growth both in its consumption and in its production.

During the process of manufacturing PET, the cyclic oligomer, mainly cyclic trimer, is produced from side reaction. This sort of oligomer is white crystallized powder with a melting point of 319 .degree.C. so as to pollute the mold while processed; consequently, the production line needs to be shut down and cleaned.

In addition, PET can be manufactured into various kinds of bottle while applied to food packaging such as the bottle for heat resistance, in which the temperature of the content is above 80 .degree.C., or into the bottom plate of packaging film which can be applied to a microwave oven or an oven, or into PET bottles used as beer containers which need to be pasteurized. The above said applications put PET high molecular compound in an environment of high temperature, which causes the residual oligomer, particularly cyclic oligomer (mainly cyclic trimer), in the high molecular compound to have a potential to transfer to the packaged content so as to hazard human health.

The said oligomer is either produced from the side reaction of PET synthesis procedure or regenerated from processing procedure.

To solve said problems, the present invention adds a compound containing phosphorus which effectively restrains the production of the cyclic oligomer produced from the side reaction during PET synthesis procedure and further effectively restrains the regeneration of cyclic oligomer during processing procedure.

DESCRIPTION OF PRIOR ARTS

Japan Publication No.12-219731 discloses that while the ratio of mole number of $SO_3X$ compound to that of metal such as antimony, or titanium, or germanium, or zink is higher than 0.01, the produced cyclic oligomer content in the melted state polymerized PET can be effectively restrained.

Japan Publication No.12-204229 discloses that to add 200~10,000 ppm of alkali metals or alkaline-earth metals such as calcium acetate or magnesium benzoate into the PET containing germanium catalyst can effectively restrain the production of cyclic oligomer.

Japan Publication No.12-219729 discloses that while the antimony element is $0.5 \times 10^{-4} \sim \times 10^{-4}$ moles relative to the acid component of PET, the phosphoric acid is added until the phosphorus element is $1 \times 10^{-4} \sim 5 \times 10^{-4}$ moles relative to the acid component of PET, wherein the mole ratio of antimony element to phosphorus element is 1~3, so as to effectively restrain the cyclic trimer down to 0.35 weight % or lower.

Japan Publication No.12-198937 discloses that while the germanium element is $0.5 \times 10^{-4} \sim 3 \times 10^{-4}$ moles relative to the acid component of PET, the phosphoric acid is added until the phosphorus element is $1 \times 10^{-4} \sim 7 \times 10^{-4}$ moles relative to the acid component of PET, wherein the mole ratio of germanium element to phosphorus element is greater than 1.6, so as to effectively restrain the cyclic trimer down to below 0.4 weight %.

Japan Publication No.12-7767 discloses that the intrinsic viscosity of raw chips before solid state polymerization is between 0.45~0.65 dl/g. While the ethylene glycol end group content is between 90~140 equivalent/$10^{-6}$ gram and the pressure is below 200 Pa and the temperature is 230 .degree.C. and the solid state polymerization reaction time is 20 hours, the decreasing rate of cyclic trimer is bigger than 300 ppm/hour. While the ethylene glycol end group content is lower than 90 equivalent/$10^{-6}$ gram, the decreasing rate of cyclic trimer is lower; however, solid state polymerization rate is bigger. While the ethylene glycol end group content is higher than 140 equivalent/$10^{-6}$ gram, the effect is opposite. The control method on the ethylene glycol end group content is to adjust the conversion rate of esterification such as to adjust the mole ratio of ethylene glycol to terephthalic acid, esterification temperature, pressure, residence time, or to adjust polycondensation reaction temperature, time, vacuum intensity, quantity of added catalyst, or further to adjust the intrinsic viscosity of polyester raw chips.

Japan Publication No.12-80284 discloses that PET chips proceeds melt blending with heat plasticized resin masterbatch which contains one of the following three structural compounds: alkylene oxide, or polyalkylene glycol, or bisphenol. The obtained resin is melted at 280 .degree.C. for five minutes. The analyzed cyclic trimer content of the product is lower than 0.5 weight % which is lower than that of the PET obtained from the process without said structural compounds.

Japan Publication No.11-181257 and Japan Publication No.9-151308 disclose that while the intrinsic viscosity is 0.7~0.9 dl/g, and the DEG content is 1~3 mole %, and the cyclic trimer content of ester chips is lower than 0.4 wt %, add a slight amount of one of the following three compounds: polyethylene, or polypropylene, or polyurethane to appropriately accelerate crystallization rate lest the constant heating temperature should be increased, due to the crystallization speed being too slow while blow-molded, consequently the cyclic trimer is produced so much as to pollute the mold. The melted ester chip is analyzed by a differential scan measuring instrument. The pollution of white powder is effectively restrained while the crystallization peak temperature for temperature increasing stage is between 155~168 .degree.C. and that for temperature decreasing stage is between 165~180 .degree.C.

Japan Publication No.11-80520 discloses that the situation of pollution on mold during blow-molding is improved while the amide compound, with a content of 1/300~1/2 of cyclic trimer wt %, is added into solid state polymerized PET.

Japan Publication No.10-259245 discloses that in PET melt polymerization process, antimony acetate is added. While the intrinsic viscosity reaches 0.35 dl/g or higher, phosphoric acid or phosphoric acid monoester is added; the production of cyclic trimer decreases when melt molded.

Japan Publication No.10-1 68168 discloses a process of producing the copolymer using terephthalic acid, ethylene glycol, and DEG with 2~4 wt % based on PET. The time point of the addition of amorphous state germanium dioxide catalyst is while the esterification ratio reaches above 90 percent so as to reduce the production of formaldehyde, acetaldehyde, and cyclic trimer while molded.

Japan Publication No.9-221540 discloses that while the DEG content of PET chips is 1~4 mole %, and the intrinsic viscosity is 0.60~0.90 dl/g, and the phosphoric acid content relative to PET is 5~25 ppm, and germanium content of germanium calyst relative to PET is 20~60 ppm, and the mole ratio of germanium element content to phosphorus element content is between 0.4~1.5, the acetaldehyde content of solid state polymerized polyester chips is below 4 ppm and the cyclic trimer content is lower than 0.5 wt %.

Japan Publication No.9-296029 and Japan Publication No 10-110026 disclose that while the intrinsic viscosity of PET is greater than 0.5 dl/g, and germanium element relative to acid component is $5\times10^{-6}$~$1\times10^{-3}$ moles and $1\times10^{-5}$~$2\times10^{-3}$ moles respectively, and the alkaline-earth metal atom content relative to PET is $1\times10^{-4}$~$5\times10^{-3}$ moles, the cyclic trimer content is low and the regenerated cyclic trimer from melting process is little.

Japan Publication No.59-25815, Japan Publication No.3-174441, Japan Publication No.6-234834, and Japan Publication No.3-47830 disclose a process that PET is treated by boiling water with 90~110 .degree.C. or higher to crystallize before solid state polymerization, by which the residule cyclic oligomer in PET chips and the regenerated cyclic oligomer during processing can be reduced.

Japan Publication No.53-101092, Japan Publication No.55-89830, and Japan Publication No.55-89831 disclose that to adjust the nitrogen gas flow and pressure of solid state polymerization can restrain the increasing rate of intrinsic viscosity, which reduces the content of cyclic oligomer.

DETAILED DESCRIPTION OF THE PRESENT INVENTION

The PET of the present invention can be obtained from the synthesis of PTA process in which purified terephthalic acid and ethylene glycol proceed with direct esterification and then melted polymerization, or from the synthesis of DMT process in which dimethyl terephthalate and ethylene glycol proceed with transesterification and then melted polymerization. The viscosity of PET obtained from each of said processes is further increased to an appropriate level by solid state polymerization. The PTA process is preferable for the present invention.

The present invention adds, during the melting reaction stage of synthesizing PET, a powder compound containing phosphorus (hereinafter called PI) with the following structure:

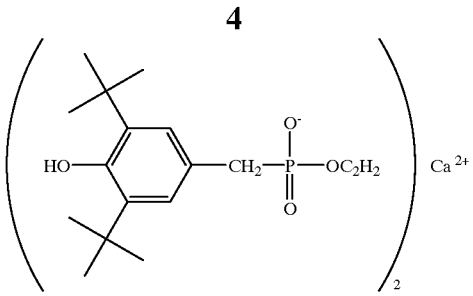

which is obviously different from said prior arts.

PI can be added into raw material blending tank of PTA process (i.e., into the thick liquid of purified terephthalic acid and ethylene glycol) or into the esterification procedure of purified terephthalic acid and ethylene glycol or into the stage after esterification and before polymerization.

The amount of PI addition is 50 ppm~3000 ppm based on polymer weight, most preferably 500 ppm~1000 ppm.

PI can be added directly in powder form or can be blended with ethylene glycol truning out to be clear solution. The concentration of the solution is 0.1~10%, preferably 1~5%, more preferably 2~4%. The blending temperature is preferably lower than 100 .degree.C., more preferably normal temperature.

The PET of the present invention is further added with heat stabilizer (hereinafter called PII) such as phosphoric acid, phosphorous acid, or phosphate. The amount of addition is 50~350 ppm, most preferably 100~200 ppm.

The catalyst for PET of the present invention is antimony catalyst such as antimony trioxide, antimony acetate or germanium catalyst such as germanium dioxide, tetraethyl germanium oxide, n-tetrabutyl germanium oxide or titanium catalyst such as tetrabutyl titanium oxide. The needed amount of addition is 10~600 ppm, most preferably 50~500 ppm. The present invention is particularly valuable to germanium catalyst and titanium catalyst with higher activeness since they are apt to produce more cyclic oligomer.

The PET of the present invention can be either homogeneous polymer or copolymer such as a copolymer of diethylene glycol (DEG), isophthalic acid (IPA), and cyclohexane dimethanol.

The PET of the present invention can be added with additives such as toner, static electricity preventer, and lubricant.

The PET of the present invention is first manufactured to chips with intrinsic viscosity of 0.45~0.65 by melted state polymerization; then, the intrinsic viscosity of which is increased to above 0.70 by solid state polymerization. The solid state polymerization can utilize stirring or tower tank through which an inert gas such as nitrogen gas or carbon dioxide is led, or can utilize revolving tank operated at vacuum environment.

The present invention further improves disadvantages of prior arts which decrease the intrinsic viscosity of raw chips and lengthen the solid state polymerization time to reduce the residual of cyclic oligomer; however, the consequences are declining of productivity and product turning yellow color. The present invention decreases the cyclic oligomer without decreasing the intrinsic viscosity of raw chips and without lengthening the solid state polymerization. The present invention which uses PI as additive can effectively decrease cyclic oligomer even in higher intrinsic viscosity. In addition, the added PI can further increase the reaction rate of solid state polymerization.

EXAMPLES

The PET of the present invention, after solid state polymerization to the level of preset intrinsic viscosity, is analyzed the residual cyclic oligomer.

The PET of the present invention is manufactured, by an ejector with model of ASB 50H, into bottle embryo which is then analyzed the cyclic oligomer regenerated from melting process.

The method of analyzing cyclic oligomer for the present invention is as follows: Accurately weigh 1000 grams of sample. Dissolve the sample by hexafluoroisopropyl alcohol solvent. Filter the solution. The filtrate is then evaporated to obtain white crystallized powder of cyclic oligomer. The obtained white powder is dissolved by dioxane and then analyzed by a high efficient liquid chromatographer to measure the respective content of cyclic trimer, cyclic tetramer, cyclic pentamer, cyclic hexamer, cyclic heptamer, wherein mainly the cyclic trimer. The content of cyclic oligomer is the summation of said cyclic tri-, tetra-, penta-, hexa-, hepta-mers.

Example 1

Take PTA and EG as raw materials. The added mole ratio of EG/PTA is 1.5. The quantity of PTA is 10.38 kg. Add 266 grams of isophthalic acid at the same time. Said three materials are blended into thick liquid. Then add PI additive and phosphoric acid. The PI additive and phosphoric acid are blended with ethylene glycol previously. The blended concentration of PI is 2.5 wt %. The amount of added PI additive is 500 ppm based on the weight of polymer. The amount of added phosphoric acid is 140 ppm based on the weight of polymer. Increase the temperature to 200~250 .degree.C. and proceed with esterification for four hours. The pressure for esterification is 1.5 kg/cm². While the esterification ratio reaches above 95%, add antimony acetate and cobaltous acetate. The amount of added antimony acetate is 500 ppm based on the weight of polymer. The amount of added cobaltous acetate is 120 ppm based on the weight of polymer. Then, proceed with vacuum polymerization. For the first polymerization stage, the duration is one hour, the vacuum intensity is from normal pressure down to 10 torr, and reaction temperature is 250~270 .degree.C. For the second polymerization stage, the vacuum intensity is down to below 1 torr, reaction temperature is 270~285 .degree.C. The stirring rate gradually decreases with the increase of viscosity. The reaction is stopped at the point that the intrinsic viscosity reaches 0.635 dl/g. The polymer is unloaded to cooling tank and is cut into raw chips with column shape.

Said raw chips are loaded in a twin-awl revolving vacuum drying tank. Vacuum intensity is 1~2 torr The polyester chips are heated by the following steps: first, 100 .degree.C. for two hours, then raise the temperature to 180 .degree.C. and heat for four hours, then raise the heating temperature to 225 .degree.C. and while the material temperature reaches above 200 .degree.C., start to count the time. While the intrinsic viscosity increases to about 0.75 dl/g, stop heating and cool down immediately.

Example 2

Process is the same as that of Example 1, however, the amount of PI additive is 300 ppm.

Example 3

Process is the same as that of Example 1, however, the amount of PI additive is 100 ppm.

Comparative Example 1

Process is the same as that of Example 1, however, without adding PI additive.

Analyze the oligomer residual if the polyester chips obtained from above examples, the results are shown as Table 1:

TABLE 1

|  |  | Example 1 | Example 2 | Example 3 | Comparative example 1 |
|---|---|---|---|---|---|
| PI additive (ppm) |  | 500 | 300 | 100 | Without addition |
| Intrinsic viscosity (dl/g) |  | 0.748 | 0.745 | 0.750 | 0.751 |
| Color (Hunter) | L | 88.5 | 88.1 | 88.1 | 88.3 |
|  | a | −1.3 | −1.6 | −1.2 | −1.5 |
|  | b | −0.5 | −0.1 | +0.6 | +0.6 |
| Solid state polymerization time (hr) |  | 18 | 19 | 20 | 20 |
| Polyester chips | Content of cyclic oligomer | 0.478% | 0.518% | 0.561% | 0.558% |
|  | Content of cyclic trimer | 0.364% | 0.397% | 0.409% | 0.419% |

Example 4

Take PTA and EG as raw materials. The added mole ratio of EG/PTA is 1.5. The quantity of PTA is 10.38 kg. The isophthalic acid is not added. Said materials are blended into thick liquid. Then add PI additive and phosphoric acid. The PI additive and phosphoric acid are blended with ethylene glycol previously. The blended concentration of PI is 2.5 wt %. The amount of added PI additive is 1000 ppm based on the weight of polymer. The amount of added phosphoric acid is 140 ppm based on the weight of polymer. Increase the temperature with the same procedures as those of said Example 1. While the esterification ratio reaches above 95%, add germanium dioxide as catalyst instead of the addition of antimony acetate and cobaltous acetate. The amount of added germanium dioxide is 130 ppm based on the weight of polymer. Proceed with the same polymerization procedures as those of Example 1. While the intrinsic viscosity reaches 0.60 dl/g, the polymer is unloaded to cooling tank and is cut into raw chips with column shape.

Said raw chips are loaded in a twin-awl revolving vacuum drying tank. Heat the polyester chips with the same procedures as those of Example 1 until the intrinsic viscosity is increased to about 0.72 dl/g.

Example 5

Process is the same as that of Example 4, however, the amount of PI additive is 1100 ppm.

Example 6

Process is the same as that of Example 4, however, the amount of PI additive is 3000 ppm.

Comparative Example 2

Process is the same as that of Example 4, however, without adding PI additive.

The polyester chips obtained from said procedures are manufactured into bottle embryos by an ejector. The manufacturing condition of ejector is the same for all examples. Analyze the oligomer residual of polyester chips and bottle embryos respectively. The results are shown as Table 2.

TABLE 2

|  |  | Example 4 | Example 5 | Example 6 | Comparative example 2 |
|---|---|---|---|---|---|
| PI additive (ppm) | | 1000 | 1500 | 3000 | Without addition |
| Intrinsic viscosity (dl/g) | | 0.718 | 0.723 | 0.725 | 0.721 |
| Color (Hunter) | L | 97.1 | 96.5 | 96.1 | 97.5 |
| | a | +0.3 | +0.3 | +0.2 | +0.5 |
| | b | +2.5 | +1.5 | +0.7 | +3.1 |
| Solid state polymerization time (hr) | | 24 | 21 | 18 | 28 |
| Polyester chips | Content of cyclic oligomer | 0.753% | 0.872% | 0.917% | 0.925% |
| | Content of cyclic trimer | 0.541% | 0.689% | 0.669% | 0.657% |
| Bottle embryo | Content of cyclic oligomer | 0.772% | N.A. | N.A. | 0.997% |
| | Content of cyclic trimer | 0.548% | N.A. | N.A. | 0.689% |

From said examples and comparative examples, adding PI additive can decrease the content of cyclic oligomer in polyester chips and can restrain the cyclic oligomer from regenerating while manufacturing embryo at processing stage. In addition, adding PI additive has an increasing effect on the solid state polymerization rate of polyester chips, and polyester chips which contain PI additive have lower cyclic oligomer though they have shorter solid state polymerization time.

What is claimed is:

1. A manufacturing method for decreasing the cyclic oligomer content in polyester, which comprises adding, during the melting process of polyethylene terephthalate, a compound containing phosphorus called PI having a structure as follows:

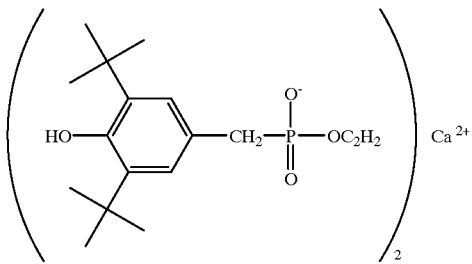

the amount of added PI is 50~3000 ppm based on the weight of polyethylene terephthalate; where the manufactured polyethylene terephthalate chips have less cyclic oligomer residual than those manufactured by a process without addition of PI.

2. A manufacturing method for decreasing the cyclic oligomer content in polyester as defined in claim 1, wherein the intrinsic viscosity of manufactured polyethylene terephthalate chips can be increased, after solid state polymerization, to above 0.70 dl/g.

3. A manufacturing method for decreasing the cyclic oligomer content in polyester as defined in claim 2, wherein the manufactured bottle embryos, after melt-heating, have less regenerated cyclic oligomer than those manufactured from chips without the addition of PI.

4. A manufacturing method for decreasing the cyclic oligomer content in polyester as defined in claim 1, wherein the polycondensation catalyst used in the melting process of polyethylene terephthalate comprises antimony catalyst selected from the group consisting of antimony trioxide and antimony acetate, or germanium catalyst selected from the group consisting of germanium dioxide, tetraethyl germanium oxide and n-tetrabutyl germanium oxide or titanium catalyst consisting of tetrabutyl titanium oxide; and the amount of addition is 10~600 ppm.

5. A manufacturing method for decreasing the cyclic oligomer content in polyester as defined in claim 4, wherein the amount of polycondensation catalyst is 50~500 ppm.

* * * * *